United States Patent [19]
Teh-Tsung

[11] Patent Number: 5,927,892
[45] Date of Patent: Jul. 27, 1999

[54] DEVICE FOR FASTENING A CABLE TO A BOARD

[76] Inventor: Chiu Teh-Tsung, No. 122,Wu Kung Rd., Wu Ku, Taipei Hsien, Taiwan

[21] Appl. No.: 08/985,967

[22] Filed: Dec. 5, 1997

[51] Int. Cl.$^6$ ........................................................ F16B 9/00
[52] U.S. Cl. ........................... 403/259; 403/256; 403/371; 285/322
[58] Field of Search ..................... 403/256, 257, 403/261, 371, 374.1, 259; 285/322, 323, 243

[56] References Cited

U.S. PATENT DOCUMENTS

| | | | |
|---|---|---|---|
| 2,159,150 | 5/1939 | Heintz ................................. | 285/322 X |
| 3,622,185 | 11/1971 | Rosan, Sr. et al. ................. | 403/269 X |
| 3,659,880 | 5/1972 | Goldsobel ............................ | 285/243 X |
| 5,072,072 | 12/1991 | Bawa et al. ......................... | 285/243 X |
| 5,332,329 | 7/1994 | Hill et al. ............................. | 403/261 |
| 5,474,403 | 12/1995 | Hetrich ............................... | 403/371 X |
| 5,695,297 | 12/1997 | Geib ..................................... | 403/371 |

*Primary Examiner*—Harry C. Kim
*Attorney, Agent, or Firm*—Pro-Techtor International Services

[57] ABSTRACT

A fastening device to fasten a cable to a board. The device includes a collar within a clamp that is compressed by tightening a chuck. The collar includes an annular groove in its end that allows uniform crushing of the collar as it is compressed. The annular groove receives pawls on the clamp as the chuck is tightened, and the pawls compress the collar in the annular groove.

1 Claim, 4 Drawing Sheets

DEVICE FOR FASTENING A CABLE TO A BOARD

BACKGROUND OF THE INVENTION

The present invention relates to a device for fastening a cable to a board in which the collar which is compressed by a chuck and a clamp to hold down the cable has an annular groove around the periphery for engagement with engagement portions of pawls of the clamp.

FIG. 4 shows a device adapted for fastening to a board to hold a cable. The device comprises a lock nut 10', a washer 20', a casing 30', a collar 40', a metal clamp 50', and a chuck 60'. The casing 30' has a tubular shape adapted for mounting in a hole of the board, a first outer thread 31' at one end, and a second outer thread 32' at an opposite end. The collar 40' is mounted within the casing 30' around the cable, having a reduced tail section 41' inwardly compressed by the clamp 50' against the cable. The metal clamp 50' comprises a center through hole 51' adapted to receive the collar 40', and a plurality of pawls 52' spaced around the through hole 51'. The pawls 52' have a respective free end terminating in a downward engagement portion 53' forced to compress the reduced tail section 41' of the collar 40' against the cable. The chuck 60' has an inner thread 62' adapted for threading onto the second outer thread 32' of the casing 30', and a tapered inside wall portion 61' adapted to compress the pawls 52' inwardly against the reduced tail section 41' of the collar 40'. This device has drawbacks. When the reduced tail section 41' of the collar 40' is compressed by the engagement portions 53' of the pawls 52' of the clamp 50', the reduced tail section 41' will be forced to wrinkle, causing the collar 40' unable to be closely secured to the periphery of the cable, therefore rain water tends to pass through the gaps between the periphery of the cable and the inside wall of the collar 40'.

SUMMARY OF THE INVENTION

The present invention has been accomplished to provide a device for fastening a cable to a board which eliminates the aforesaid problems. According to the present invention, the collar is compressed by a chuck and a clamp to hold down a cable in a hole of a board has an annular groove around the periphery for engagement with engagement portions of pawls of the clamp. When the chuck is installed, the engagement portions of the pawls of the clamp are compressed against the annular groove of the collar and the periphery of the cable, and the wall portion at the annular groove of the collar is retained in close contact with the periphery of the cable, and therefore the cable is retained in place and no water gap exists between the periphery of the cable and the inside wall of the collar.

DETAILED DESCRIPTION OF THE PREFERRED EMBODIMENT

Figure 1:
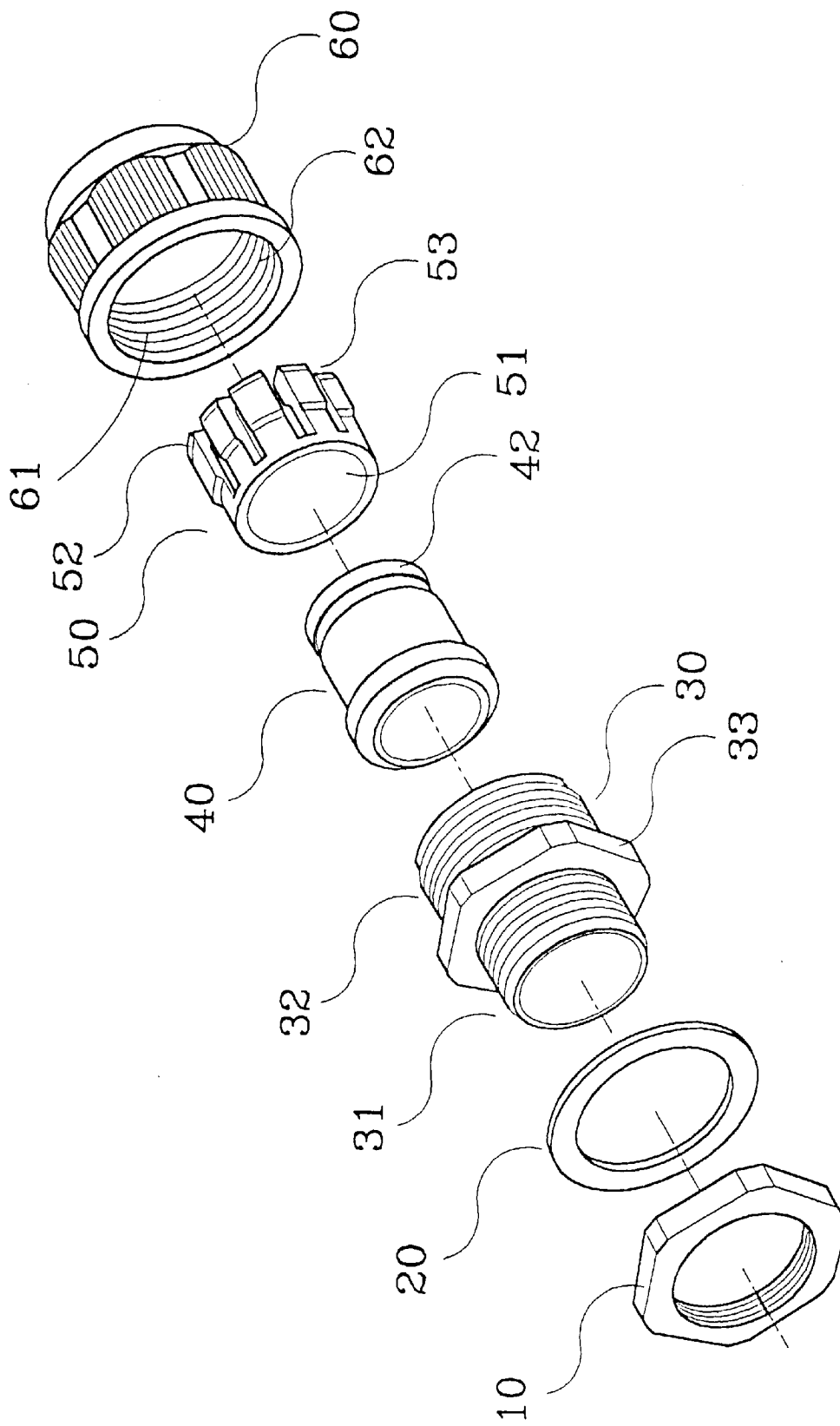
FIG. 1 is an exploded view of a device for fastening a cable to a board according to the present invention.
Figure 2C:
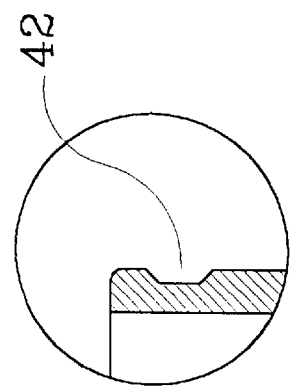
FIG. 2C is an enlarged view of a part of FIG. 2A.
Figure 2A:
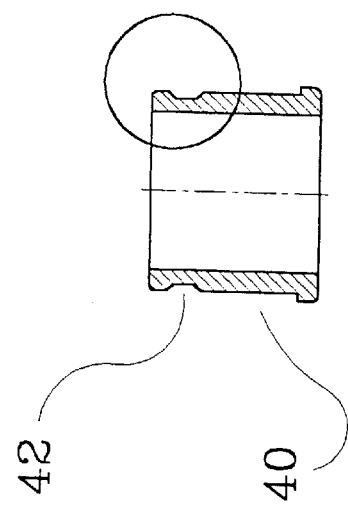
FIG. 2A is a longitudinal view in section of a collar according to the present invention.
Figure 2B:
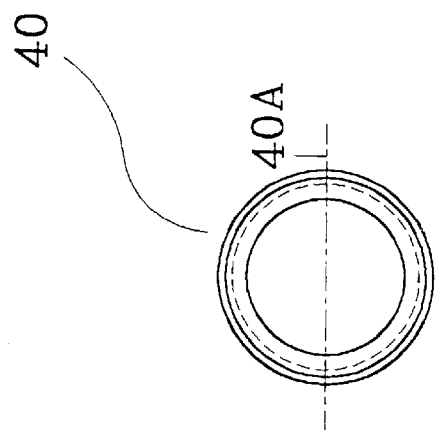
FIG. 2B is a top plain view of the collar shown in FIG. 2A.

Referring to FIGS. 1, 2A, 2B and 2C, the present invention comprises a lock nut 10, a washer 20, a casing 30, a collar 40, a metal clamp 50, and a chuck 60. The casing 30 has a tubular shape, a first outer thread 31 at one end, a second outer thread 32 at an opposite end, and a polygonal outward flange 33 raised around the periphery in the middle between the first outer thread 31 and the second outer thread 32. The metal clamp 50 comprises a center through hole 51 adapted to receive the collar 40, and a plurality of pawls 52 spaced around the through hole 51. The pawls 52 have a respective free end terminating in a downward engagement portion 53. The chuck 60 has an inner thread 62 adapted for threading onto the second outer thread 32 of the casing 30, and a tapered inside wall portion 61 adapted to compress the pawls 52 inwards. The collar 40 has an annular groove 42 around the periphery near its rear end (see FIGS. 2A, 2B and 2C).

Figure 3:
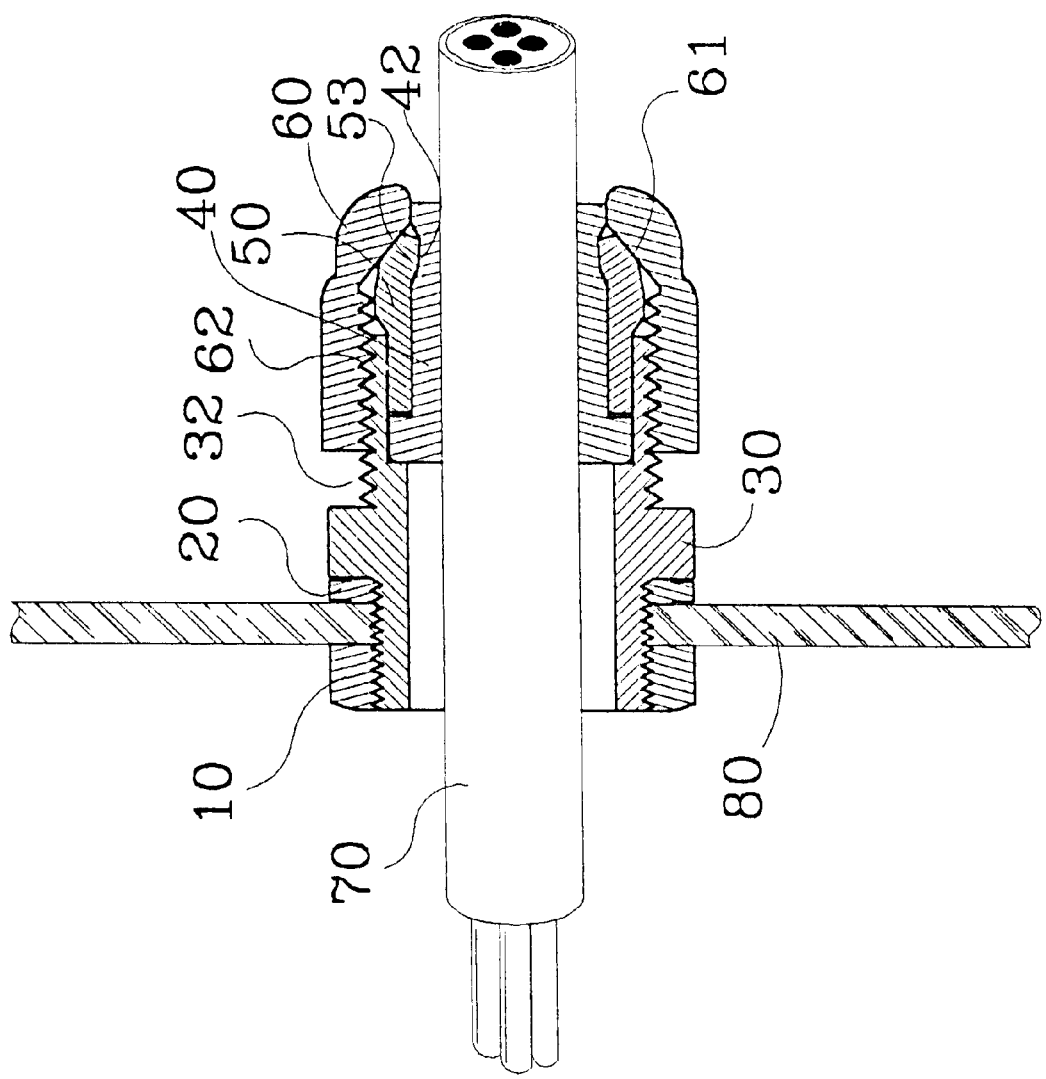
FIG. 3 is a sectional view of the present invention, showing the device installed.
Figure 4:
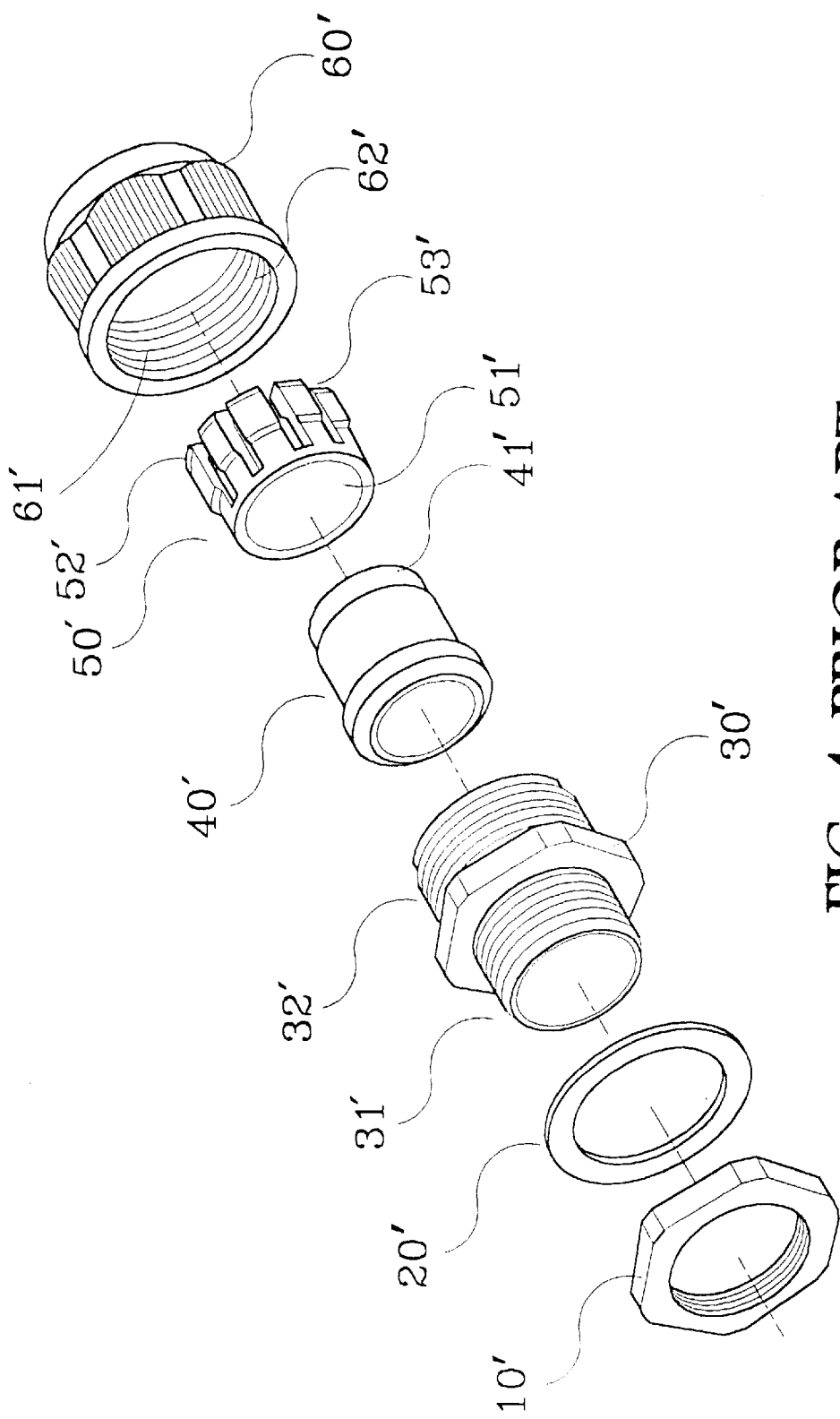
FIG. 4 is an exploded view of a device for fastening a cable to a board according to the prior art.

Referring to FIG. 3, the clamp 50 is sleeved onto the collar 40 and the collar 40 is sleeved onto the cable 70, and then the casing 30 is mounted in a hole of a board 80 around the metal clamp 50, the collar 40 and the cable 70 partially, and then the lock nut 10 is threaded onto the first outer thread 31 of the casing 30 to fix the casing 30 to the board 80, permitting the washer 20 to be firmly retained around the casing 30 between the board 80 and the polygonal outward flange 33 of the casing 30 and at one side of the board 80 opposite to the lock nut 10, and then the inner thread 62 of the chuck 60 is threaded onto the second outer thread 32 of the casing 30 to force the tapered inside wall portion 61 against the pawls 52 of the metal clamp 50, causing the engagement portions 53 of the pawls 52 to be forced into engagement with the annular groove 42 of the collar 40, and therefore the wall of the collar 40 at the annular groove 42 is inwardly compressed against the periphery of the cable 70 to hold down the cable 70. Because the collar 40 is inwardly compressed against the cable 70 at an endless line corresponding to the annular groove 42, the cable 70 will not be damaged when it is turned through 360°.

What the invention claimed is:

1. A fastening device adapted to hold a cable in position on a board, said fastening device comprising:

a tubular casing adapted to be mounted in a hole of said board with said cable extending through said hole and said casing, said casing having a first outer thread at one end, a second outer thread at an opposite end, and a polygonal outward flange raised between said first outer thread and said second outer thread;

a collar mounted within said tubular casing and adapted to receive said cable therethrough;

a metal clamp partially mounted within said tubular casing around said collar, said metal clamp having a plurality of pawls spaced around said collar, each of said pawls having a respective free end terminating in a downward engagement portion respectively forced against said collar;

a lock nut threaded onto said first outer thread of said tubular casing and adapted to be stopped at one side of said board;

a washer mounted around said tubular casing and adapted to be retained between another side of said board opposite said lock nut and abutting the polygonal outward flange of said tubular casing; and a chuck having an inner thread threaded onto said second outer thread of said casing, said chuck having a tapered inside wall portion to compress the pawls of said clamp to force said engagement portions of said pawls of said clamp against said collar and said cable; wherein said collar has an annular groove around an outer periphery of said collar near one end and an inner wall opposite said annular groove on an inner periphery of said collar, said annular groove receives said engagement portions of said pawls of said clamp and whereby said inner wall is inwardly compressed for engaging and holding said cable as said engagement portions are forced into engagement with said annular groove by said tapered inside wall portion of said chuck.

* * * * *